United States Patent [19]

DeLuca et al.

[11] Patent Number: 4,835,777
[45] Date of Patent: May 30, 1989

[54] RADIO PAGING RECEIVER INCLUDING DUPLICATE PAGE DETECTION AND ERROR CORRECTION CAPABILITY

[75] Inventors: Joan S. DeLuca; Michael J. DeLuca, both of Boca Raton, Fla.

[73] Assignee: Motorola, Inc., Schaumburg, Ill.

[21] Appl. No.: 927

[22] Filed: Jan. 7, 1987

[51] Int. Cl.$^4$ ............................................. G06F 11/00
[52] U.S. Cl. ................................................. 371/69
[58] Field of Search ......................... 371/69, 22, 31, 67; 455/32, 38; 340/825.44

[56] References Cited

U.S. PATENT DOCUMENTS

| | | | |
|---|---|---|---|
| 3,732,541 | 5/1973 | Neubauer | 371/69 |
| 3,876,980 | 4/1975 | Haemming | 371/69 |
| 4,286,334 | 8/1981 | Gammel | 371/69 X |
| 4,383,257 | 5/1983 | Giallanza | 340/825.44 X |
| 4,551,842 | 11/1985 | Segarra | 371/30 X |
| 4,653,055 | 3/1987 | Micic | 371/69 |
| 4,704,608 | 11/1987 | Sato | 340/825.44 |
| 4,759,022 | 7/1988 | Akerberg | 371/69 |

*Primary Examiner*—Jerry Smith
*Assistant Examiner*—Robert W. Beausoliel
*Attorney, Agent, or Firm*—Michael J. DeLuca; Vincent B. Ingrassia

[57] ABSTRACT

A digital paging receiver is provided which includes apparatus for determining if an incoming page message is a duplicate of a prior page message already stored in the memory of the receiver. If the current page message is determined to be a duplicate of such prior page, errors which are contained in the prior page are replaced with data from such duplicate page to reduce or eliminate errors in the stored page.

8 Claims, 12 Drawing Sheets

| LOC A | MESSAGE 1 |
|---|---|
| LOC B | MESSAGE 2 |
| LOC C | MESSAGE 3 |
| LOC D | MESSAGE 4 |

FIG.3

| | PAGE ADDRESS | PAGE MESSAGE | | | | | | |
|---|---|---|---|---|---|---|---|---|
| | | DB | DB | DB | DB | DB | DB | DB |
| LOC A | | | | | | | | |
| LOC B | | | | | | | | |
| LOC C | | | | | | | | |
| LOC D | | | | | | | | |
| LOC E | | | | | | | | |
| LOC F | | | | | | | | |
| LOC G | | | | | | | | |
| LOC H | | | | | | | | |

PAGE ADDRESS 2FE6

| | DB1 | DB2 | DB3 | DB4 | DB5 | DB6 | DB7 | |
|---|---|---|---|---|---|---|---|---|
| | 4 | 7 | 5 | 6 | 4 | 4 | 9 | ← 3rd PAGE |

FIG. 6J

PAGE ADDRESS 2FE7

| | DB1 | DB2 | DB3 | DB4 | DB5 | DB6 | DB7 | |
|---|---|---|---|---|---|---|---|---|
| | 1 | 4 | 7 | 2 | 8 | 6 | 0 | ← 4th PAGE |

FIG. 6K 115

PAGE ADDRESS 2FE7

| | DB1 | DB2 | DB3 | DB4 | DB5 | DB6 | DB7 |
|---|---|---|---|---|---|---|---|
| | 1 | * | 7 | 2 | * | 6 | 0 |

FIG. 6L

| MEMORY LOCATION | PAGE ADDRESS | | | | PAGE MESSAGE | | | | | | | |
|---|---|---|---|---|---|---|---|---|---|---|---|---|
| | | | | | DB1 | DB2 | DB3 | DB4 | DB5 | DB6 | DB7 | |
| 0001 | $ | 2 | F | E | 6 | 1 | 2 | 3 | 4 | 5 | 6 | 7 | ← 1st PAGE |
| 0002 | $ | 2 | F | E | 6 | 4 | 7 | 5 | 6 | 4 | 4 | 9 | ← 3rd PAGE |
| 0003 | $ | 2 | F | E | 7 | 1 | * | 7 | 2 | * | 6 | 0 | ← 4th PAGE |

RADIO PAGING RECEIVER INCLUDING DUPLICATE PAGE DETECTION AND ERROR CORRECTION CAPABILITY

BACKGROUND OF THE INVENTION

This invention relates to radio paging receivers and, more particularly, to error detection and correction in radio paging receivers.

In the past several years, radio paging technology has advanced from the rather simple tone-only pager (tone alert only, no voice), to the tone and voice pager (tone alert with a voice message) and more recently to the alphanumeric display pager. In a typical conventional display paging system such as that shown as system 10 in FIG. 1, a central transmitter or paging terminal 20 is used to generate the radio pages which are transmitted via a radio link to a fleet of paging receivers 1, 2, 3 ... N, wherein N is the total number of pagers in system 10. A unique digital address is associated with each of paging receivers 1, 2, 3 ... N. A page which is transmitted by paging terminal 20 consists of the unique digitally encoded address of the particular pager to which the page is targeted, immediately followed by a corresponding digitally encoded numeric or alphanumeric page message which is intended for display on the target pager.

Typically, the numeric or alphanumeric page message is stored in a memory within the paging receiver for later recall and display by the pager user. Paging receivers are available with a wide range of message storage capabilities which range from the ability to store just a few rather short numeric page messages to the ability to store a relatively large number of longer alphanumeric page messages.

A modern display paging system must have the capability of recognizing duplicate page messages since in such systems it is possible for the pager to receive the same page message several times. For example, to obtain wider and more reliable coverage, the same page (address plus alphanumeric message) is transmitted several times in some paging systems. This, of course, could result in the same page message being displayed more than once to the user if duplicate page checking and duplicate page suppression were not provided. Message duplication also occurs when the operator of the paging terminal operator through error or for whatever reason sends the same message more than once. Display terminal operators may send the same message more than once when the display pager user to which the page message is addressed is known to be in a marginal coverage area. Such duplicate page messages need to be suppressed not only because they are an annoyance to the pager user, but also because duplicate pages consume valuable memory space in display pagers which use a Random Access Memory (RAM) to store incoming page messages for later viewing by the pager user. The simplest duplicate page checking mechanism merely checks the contents of corresponding data blocks of incoming page messages with those page messages already stored in memory to determine if there is duplicity. This approach would work well except when the duplicate page or the original page message contains errors which make such a straightforward comparison difficult. An optimum duplicate page checking mechanism in a pager would detect all duplicate pages even though the duplicate page or the original page contains errors in some alphanumeric characters. If the pager fails to detect the presence of a duplicate page message, then storage of incoming duplicate page messages can result in the removal of yet unread earlier page messages which were stored in the memory of the display pager.

For example, conventional display pagers are known which include a memory having the capability of holding to 4 messages. In the alphanumeric version of this pager, each message can be up to 40 alphanumeric characters long. Stored messages are read out of memory and displayed in "last in—first out" (LIFO) fashion When the pager memory is full of unread messages and yet another message is received, the oldest message is replaced by the present received message. Thus, unread messages can be lost when the pager user neglects to read stored messages.

The problem of losing unread messages in a display pager with a message memory is compounded by duplicate page messages, and the problem becomes more pronounced when the display pager memory accommodates fewer messages. By way of example, assume that the display pager memory 30 as seen in FIG. 2 includes 4 memory locations designated A, B, C and D which are presently filled with unread messages 1, 2, 3 and 4, respectively. Message 1 in location A is the least current message and message 4 in location D is the most current message. When a message 5 is received by the display pager, then message 5 is stored in location A by overwriting message 1 thus destroying message 1.

Pager users understand that page messages left unread for long periods of time in the pager will eventually be overwritten by more current messages. However, in a severe case, if a series of duplicate pages are received and the pager has an inadequate means for detecting the presence of highly errored duplicate pages and for suppressing such duplicate pages, then the entire contents of the pager memory can be lost. Although such an occurrence would not be common, it is nonetheless a concern.

Continuing with the example above wherein message 1 has just been over written by message 5, assume that a series of 3 highly errored duplicate page messages 6, 7 and 8 is received by the target display pager. Message 2 (location B), message 3 (location C) and message 4 (location D) are overwritten by incoming duplicate page messages 6, 7 and 8. In this severe example, it is thus seen that the inability to detect highly errored duplicate page messages has caused three unread messages to be lost from memory.

One approach to the problem of highly errored duplicate page messages is to provide display pagers which can store a large number of messages. In this manner if some page messages happen to be duplicates, the likelihood of overwriting a prior unread page message is lessened. However, additional memory is expensive and setting aside such additional memory for duplicate page messages is not cost effective. It is also inconvenient for the pager user to have duplicate messages stored in the pager memory.

Thus far the problem of duplicate page messages in a display pager has been discussed as though the display pager only had a single address. However, modern display pagers often have multi-address capability. Duplicate pages received on such multi-address pagers can cause additional confusion. For example, one typical multi-address pager has three different addresses (or source numbers) which the paging terminal can call to reach the pager. In such modern paging systems the messages are divided up into smaller data blocks by the paging terminal for transmission to the pagers. Each data block contains at least one character (as used for convenience in the subsequent examples), but usually contains a plurality of characters. Each data block contains parity or error correction information. For example in the POCSAG paging coding scheme, each data block is a (31,21) word wherein 31 refers to the total number of characters in the word and 21 refers to the number of information characters in the word. The remaining characters of the word are dedicated to parity bits which permit bit error correction. Conventional pagers are known to employ a bit error correcting algorithm to correct bit errors. If the number of bit errors exceeds a predetermined number of errors, then the data block is considered to be an uncorrectable errored data block in conventional pagers.

Conventional pagers do not consider duplicate page messages with errors to be duplicate pages and thus a single message which is transmitted several times and received with errors will be stored in several memory locations. In this manner, valuable memory space is wasted in conventional pagers.

FIG. 3 contains a simplified representation of the memory of such a multi-address pager wherein the page message consists of a plurality of data blocks designated DB. The detection of highly errored duplicate pages also is a concern in multi-address pagers. A data block of a page message is determined to be in error when the number of bit errors exceed the number of errors which are correctable by the selected bit error correcting algorithm employed in the pager. In practice, each page message is typically stored at a location in memory (A-H, for example) together with the corresponding page address (source number) for which it is intended. In this manner information is available such that the display can indicate to the user the particular address to which the page message is addressed. For example, in the case of a 3 address display pager, address 1 could indicate low priority page messages, address 2 could be associated with medium page messages and address 3 could be associated with the highest priority pages. Alternatively, addresses 1, 2 and 3 could be associated with messages originating from three different sources. In such case, the three addresses would appropriately be called source numbers.

At this point in time, it is believed that no single address or multi-address paging receivers are known which employ both a high reliability mechanism to detect duplicate page messages and which use the duplicate page message, once detected, to provide error correction to the original message already stored in the pager memory.

BRIEF SUMMARY OF THE INVENTION

One object of the present invention is to provide a paging receiver which provides error correction to a stored paging message when a duplicate of that message is later received by the paging receiver.

Another object of the present invention is to provide a paging receiver which includes a high reliability mechanism for determining the existence of duplicate pages.

Another object of the invention is to provide a paging receiver which is capable of using a duplicate page to correct errors in a prior stored page even though the duplicate page itself contains error characters.

In one embodiment of the invention, a radio paging receiver which receives, decodes and displays pages transmitted over a radio link is provided. The pager includes a receiving section for receiving coded pages which include an address portion and a corresponding data message portion, thus producing received pages. A decoder circuit is coupled to said receiving section for decoding the received pages. A memory is coupled to the decoder circuit such that the memory stores the message portion of a page as decoded by the decoder circuit. The pager further includes a replacement or substitution means for replacing errored data blocks of a prior message portion with unerrored data blocks of a subsequent message portion when the subsequent message portion is determined to be a duplicate of the prior message portion.

In one microprocessor embodiment of the invention, the microprocessor determines that a subsequent page is a duplicate of a prior page to a reasonable degree of certainty by checking to assure that at least two consecutive data blocks of the subsequent message portion are unerrored or that more than 50% of the data blocks of the subsequent message portion are unerrored.

The features of the invention believed to be novel are specifically set forth in the appended claims. However, the invention itself, both as to its structure and method of operation, may best be understood by referring to the following description and the accompanying drawings.

BRIEF DESCRIPTION OF THE DRAWINGS

FIG. 2 is a representation of a the message storage memory of a conventional display pager.

FIG. 3 is a more detailed representation of the message storage memory of a conventional display pager having multiple addresses.

DETAILED DESCRIPTION OF THE INVENTION

Figure 1:
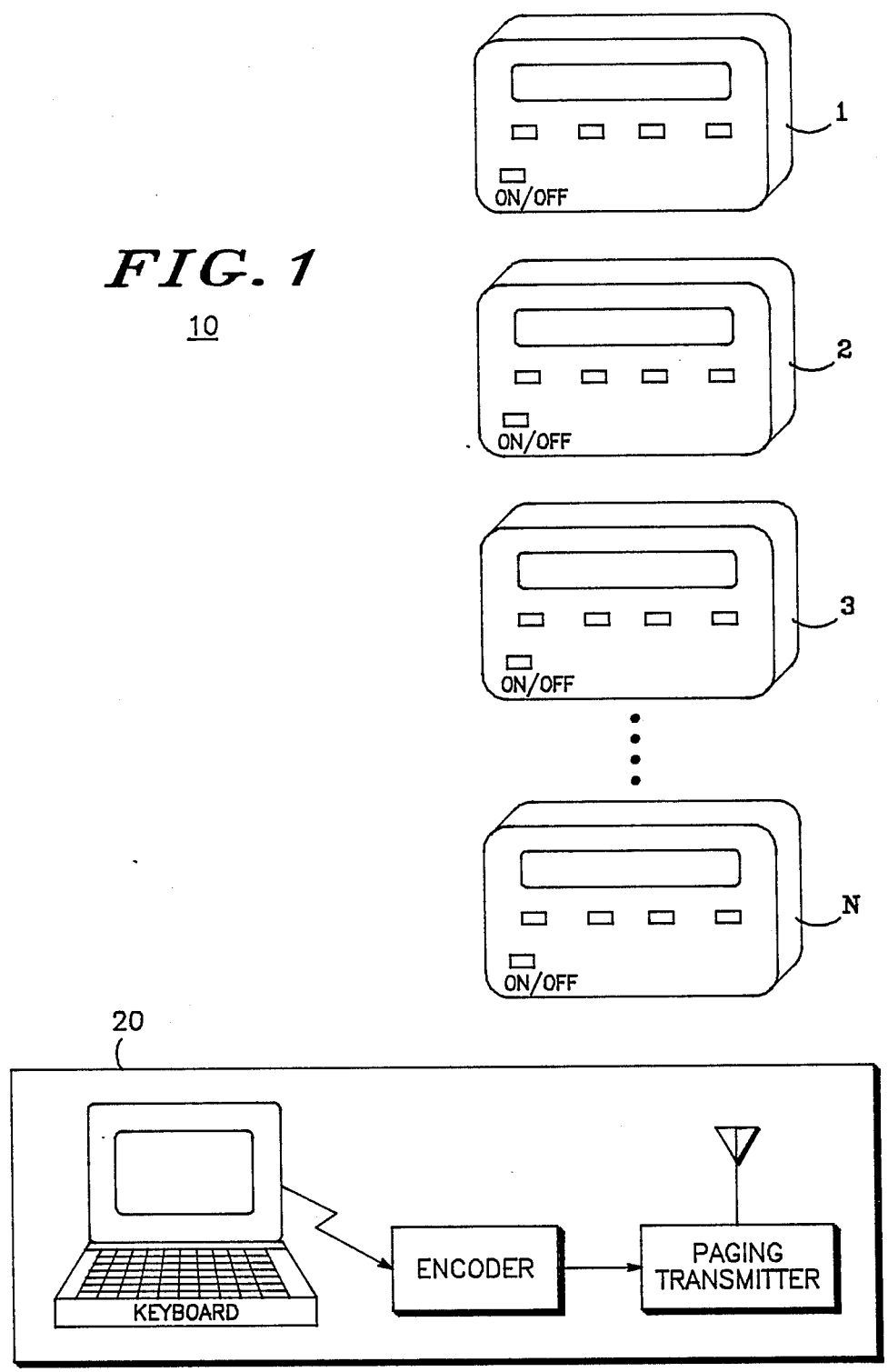
FIG. 1 a block diagram of a conventional digital display paging system.
Figure 4:
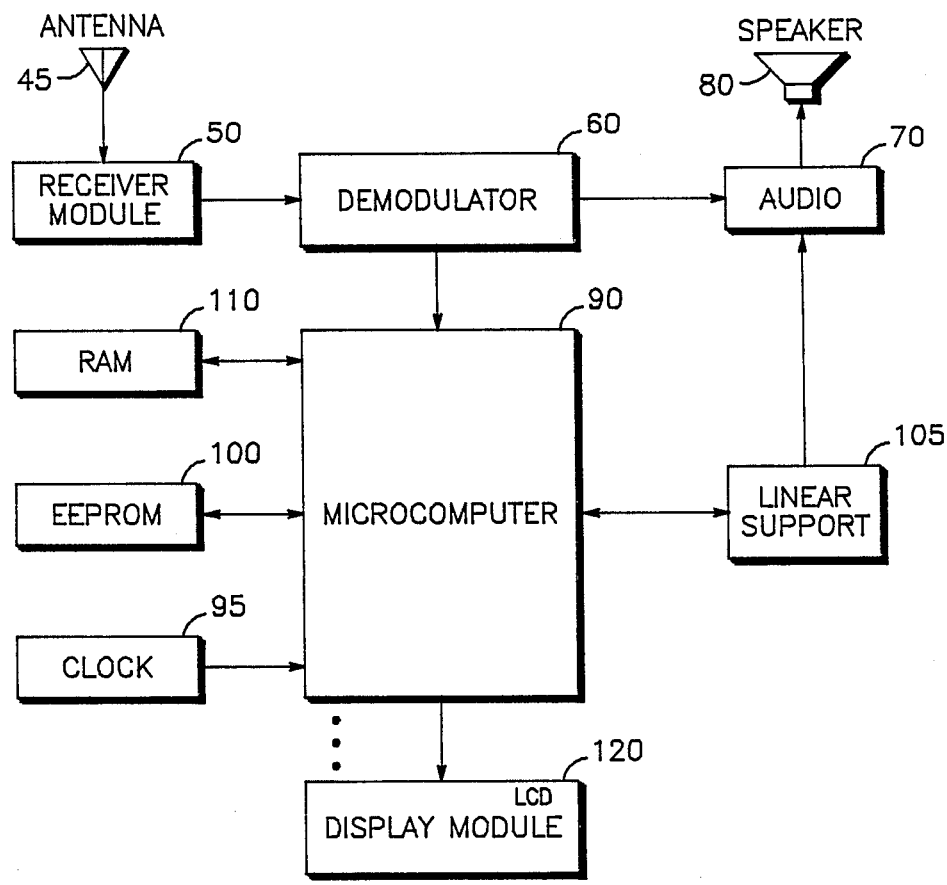
FIG. 4 is a block diagram of the display pager of the present invention.

Turning now to FIG. 4, one embodiment of the paging radio communications receiver of the present invention is shown as including an antenna 45 coupled to receiver module 50. The output of receiver module 50 is coupled to the input of a demodulator 60. The radio frequency paging signals received by receiver module 40 are mixed together with a local oscillator signal generated in receiver module 40 such that an intermediate frequency (IF) is produced. The IF signal is a lower frequency signal suitable for processing by demodulator 60 in a manner well known to those skilled in the radio communications art. The IF signal is provided to demodulator 60 which recovers the page address, page message (data) and voice (analog audio) components originally transmitted on the paging signal.

For voice pages, the recovered audio (voice) present at demodulator 60 is fed to audio module 70. Audio module 70 amplifies the recovered audio signal to a level at which it can easily be heard through speaker 80 which is coupled to the output of audio module 80.

For data messages, the page address and page message are applied to an input of microcomputer 90. A clock module 95 is coupled to a clock input of microcomputer 90 to provide a clocking signal thereto. Microcomputer 90 decodes the page address data in a known fashion and compares the decoded page address with predetermined unique addresses stored in a code memory 100. Code memory 100 is typically an electronically erasable programmable read only memory (EEPROM) such that unique pager address codes are easily assigned and programmed into each paging receiver. When microcomputer 90 determines that the page address of an incoming page matches that of one address stored in code memory 100, then microcomputer 90 decodes the page message which accompanied the page address. Microcomputer 90 generates appropriate output signals which are supplied via linear support module 105 to audio module 70 and speaker 80 to alert the pager user that a message has been received. The decoded page message along with its address are stored in a random access memory (RAM) 110 coupled to microcomputer 90. A liquid crystal display module 120 is coupled to an output of microcomputer 90 such that, at the instruction of the pager user, the page message or messages stored in memory 120 may be read out and displayed for viewing by the pager user.

Figure 5:
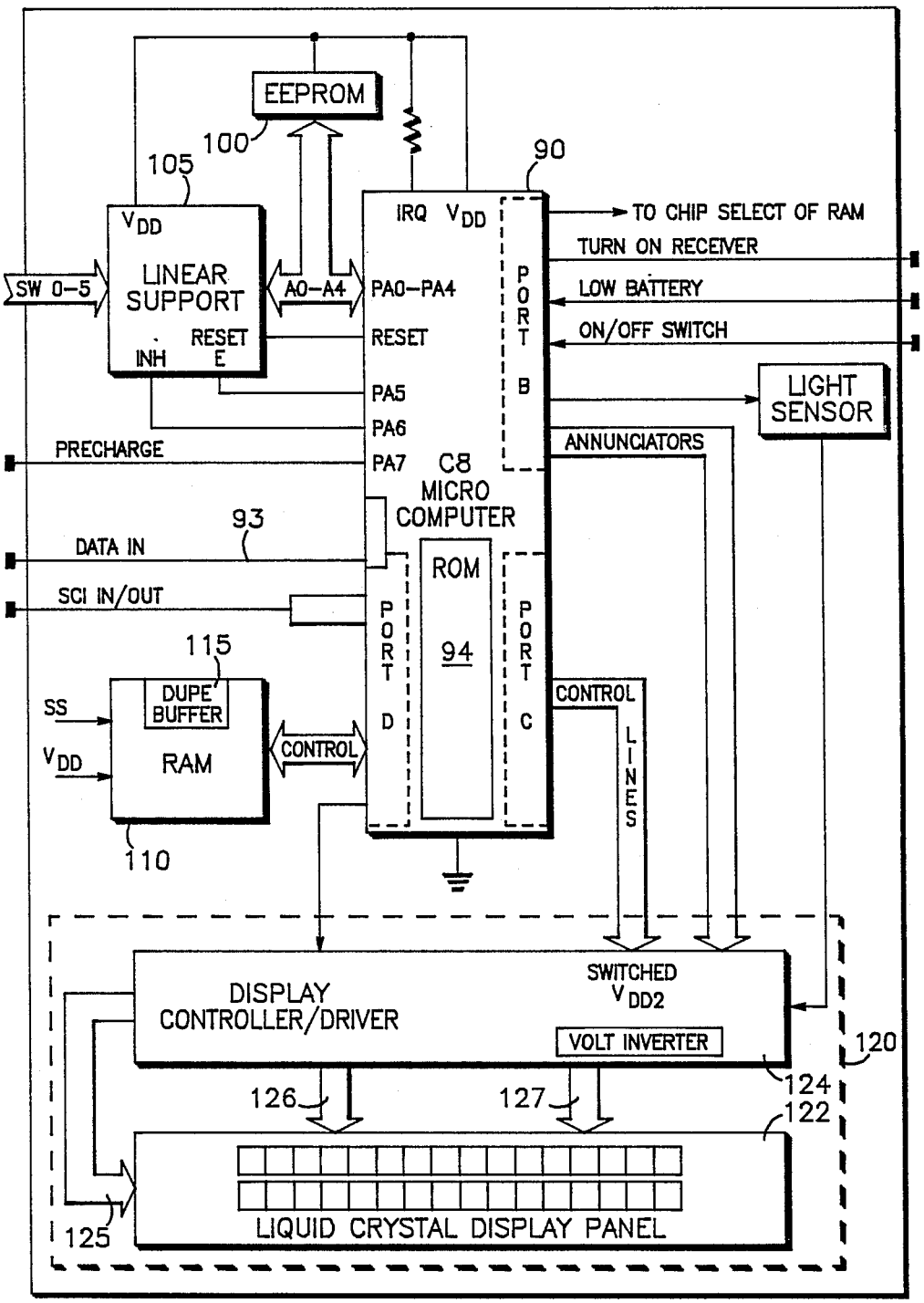
FIG. 5 is a more detailed block diagram of the display pager of the present invention.

FIG. 5 is a more detailed diagram of the paging receiver of FIG. 4 including microcomputer 90, RAM 110, code memory 100 and display module 120. One microcomputer which may be employed as microcomputer 90 is the Model MCM68HC05C8 manufactured by Motorola, Inc. Page data from demodulator 60 are applied to microcomputer 90 via data line 93. An on-chip ROM 94 includes the program for manipulating the data received by microcomputer 90 to check for duplicate pages and to perform error correction by using the data included in such duplicate pages. This program will be discussed later in more detail. Page messages are displayed on a liquid crystal display panel 122 included in display module 120. Display module 120 also includes a display controller driver 124 and signal lines 125, 126 and 127. The signal lines 125, 126 and 127 drive the display panel 122 to form alphanumeric characters on panel 122 in accordance with practices well known to those skilled in the display arts.

A portion of RAM 110 is segmented off from the rest of RAM 110 to form a duplication buffer 115 which contains sufficient memory space to temporarily store an incoming page message (most current received and decoded page message) while such page message is compared with prior page messages already stored in RAM 110. The microcomputer 90 performs this comparison of the incoming page message in duplication buffer 115 with the prior page messages in RAM 110 to determine if the incoming page message is a duplicate of any page messages already stored in RAM 110. The unique way this duplicate page determination is made is one aspect of the present invention.

The following discussion describes the manner in which the microcomputer 90 and associated circuits operate on incoming pages. It will be assumed for purposes of this example that each page includes a page address portion ad an data page message portion. That is, we are dealing with data pages. In contrast to data pages, any received voice pages, are provided to audio module 70 and speaker 80 in a known manner such as that employed in the OPTRX pager manufactured by Motorola, Inc. For purposes of this document, the term "data message portion" includes page messages which are alphabetic, numeric or a combination of both alphabetic and numeric characters. The term "data message portion" also includes graphical message information, digitally coded voice message information (for example, linear predictive coding (LPC) voice information), or other data messages.

Figure 6A:
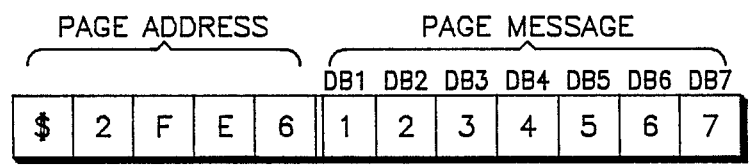
FIG. 6A-6P are representations of the contents of the duplication buffer and the memory of the pager in several embodiments of the invention.

FIG. 6A is a representation of a digitally coded data page as transmitted by paging terminal 20 prior to corruption of the such page by conditions or interference in the signal path between terminal 20 and the paging receiver. As seen in FIG. 6A, the page includes a page address, $2FE6 in this example. The page address is followed in time by a plurality of data blocks, DB1-DB7 which together comprise the page message. Those skilled in the art appreciate that such data blocks may contain a plurality of alphanumeric characters. Both the page address and the data blocks of the page message contain parity information to enable microcomputer 90 to determine if an error has occurred in such page address or the data blocks. More information can be obtained on various paging signalling schemes by referring to any standard text which discusses GOLAY sequential code or POCSAG paging signalling protocols.

In this example, it is assumed that the paging receiver of FIG. 4 of the present invention is the multi-address type. That is, receiver 40 is assigned two unique addresses, $2FE6 and $2FE7 for example, either of which when received by receiver 40 cause receiver 40 to store in memory (RAM) 110 the data page message which accompanies such address. The page shown in FIG. 6A will be referred to as the original message or the first page. The invention is readily employed on pagers having more than two unique addresses as well.

Unfortunately, the original page as well as subsequent pages are often subject to interference and poor signal path conditions which result in errors in one of more of the data blocks of the data message decoded by microcomputer 90. In the present example, each of the data blocks of the received page message is decoded and checked for errors by microcomputer 90. If microcomputer 90 finds that an error has occurred in a particular data block, a predetermined error character (for example, a "*" as used here) is substituted in that data block to denote that an error has occurred in such block. (It will be recalled from the earlier discussion that a data block is determined to be in error when the number of bit errors exceeds the number of errors which are correctable by the particular bit error correcting algorithm employed in the pager.)

Figure 6B:
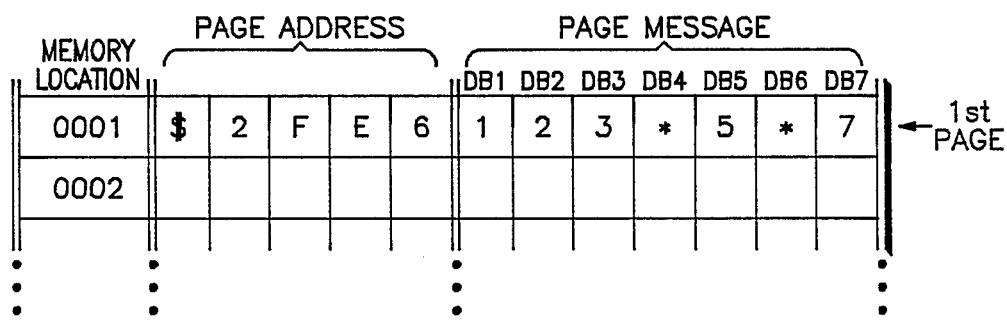

The data blocks of the decoded page message including any data blocks with error characters are stored in RAM 110 at a selected memory location together with the accompanying page address associated with such page message. As seen in FIG. 6B, the page address and page message of the first page are stored together at a memory location 0001. It is noted that data blocks, DB4 and DB6, contain errors and thus the first page message as stored in RAM 110 appears as 123*5*7 as shown.

It is assumed that the pager receiver 40 has just been turned on and that the microcomputer 90 has just been initialized. It also assumed that memory 110 is empty and that the first page message is about to be received. In one embodiment of the invention, the microcomputer 90 places the first page message directly in memory 110 without placing it first in duplication buffer 115 because no duplication test is necessary since it is the first page message. Thus, by definition, the first page can have no prior duplicate page already stored in memory 110. All subsequent page messages are however tested for duplication and if found to be a duplicate of a prior stored message are subjected to error correction in accordance with the invention. In order for two page messages to be candidates for being duplicates, such page messages must have the same length or the length of one of the message must be undetermined in that an end of message marker was missed. It is noted that messages in memory 110 are generally unread messages unless the user has specified otherwise.

Figure 6C:
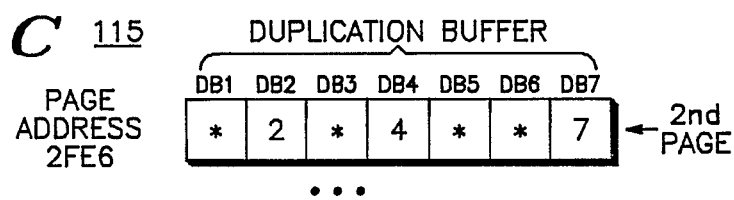

As seen in FIG. 6C, paging receiver 40 receives a second page for address $2FE6 which is a duplicate of the first page message, such duplicate message being hereinafter referred to as the first duplicate. The page message portion of the second page is temporarily stored in duplication buffer 115 while microcomputer 90 compares the message portion of the second page with the message portion of the first page to determine if there is a duplication. For purposes of this example, the message portion of the second page is represented by the data blocks *2*4**7 as shown in duplication buffer 115.

In one embodiment of the invention, microcomputer 90 determines if the message portion of the second page is a duplicate of the message portion of the first page by checking each data block of the second page message portion in the duplication buffer 115 with the corresponding data block of the first page message portion stored in location 0001 in memory 110, except for errored data blocks of the first and second page message portions which are regarded as "don't cares" or "don't knows". A duplication is defined to exist if no mismatched comparison pairs are found not considering the "don't know" data block comparisons. If a single mismatch between corresponding data blocks occurs, that is if the contents of a single data block of the first page message portion are not identical with the contents of a corresponding data block of the second page message portion, the duplication test continues no further because a determination is then reached that the second page message portion is not a duplicate of the first page message portion.

The details of this comparison which is designated the first duplicate page test are now discussed more specifically. Referring to FIGS. 6B and 6C. It is seen that data block DB1 of the first page message portion (FIG. 6B) contains a 1 and data block DB1 of the second page message portion (FIG. 6C) contains a "*" which signifies an error in data block DB1. Thus, the result of this comparison is a "don't care" or a "don't know". A "don't know" is not a mismatch which would signify non-duplication under this comparison test so the microcomputer continues from the DB1 comparison to a comparison of the contents of data block DB2 of the first page message (FIG. 6B) with the contents of data block DB2 of the second page message (FIG. 6C). It is seen than DB2 of the first page message portion (FIG. 6B) in RAM 110 contains a "2" and that DB2 of the second page message portion (FIG. 6C) in duplication buffer 115 contains a "2" as well. Thus, the DB2 data blocks of the first and second page message portion match. It is noted that to this point in the comparison test, no mismatches between corresponding data blocks have been found so the test continues to a comparison of the DB3 data blocks of the first and second page message portions.

The data block DB3 of the first page message portion (FIG. 6B) in RAM 110 contains a "3" and the data block DB3 of the second page message portion (FIG. 6C) in duplication buffer 115 contains a "*". Thus, the DB3 comparison results in neither a match nor a mismatch (that is, a "don't know") so the test continues to a comparison of the DB4 data blocks of the first and second page message portions.

The data block DB4 of the first page message portion (FIG. 6B) in RAM 110 contains a "*" and the data block DB4 of the second page message portion (FIG. 6C) in duplication buffer 115 contains a "4". Thus, the DB4 comparison results in neither a match nor a mismatch (that is, a "don't know") so the test continues to a comparison of the DB5 data blocks of the first and second page message portions.

The data block DB5 of the first page message portion (FIG. 6B) in RAM 110 contains a "5" and the data block DB5 of the second page message portion (FIG. 6C) in duplication buffer 115 contains a "*". Thus, the DB5 comparison results in neither a match nor a mismatch (that is, a "don't know") so the test continues to a comparison of the DB6 data blocks of the first and second page message portions.

The data block DB6 of the first page message portion (FIG. 6B) in RAM 110 contains a "*" and the data block DB6 of the second page message portion (FIG. 6C) in duplication buffer 115 contains a "*" as will. Thus, the DB6 comparison results in neither a match nor a mismatch (that is, a "don't know" since an errored data block is compared with another errored data block) so the test continues to a comparison of the DB7 data blocks of the first and second page message portions.

The data block DB7 of the first page message portion (FIG. 6B) in RAM 110 contains a "7" and the data block DB4 of the second page message portion (FIG. 6C) in duplication buffer 115 contains a "7", as well. Thus, the DB7 comparison results in a match.

In summary of duplicate page comparison test 1, matches have been found between data blocks DB2 of the first and second page message portions and between data blocks DB7 of the first and second page message portions. "Don't know" situations have been identified for the corresponding DB1, DB3, DB4, DB5 and DB6 data blocks. Again note that under this test, "don't know" situations count neither as matches nor mismatches. Since at least one match has been found and no mismatches between corresponding data blocks of the first and second page message portions have been identified, the microcomputer 90 flags the second page message portions as being a duplicate of the first page message portion.

Figure 6D:
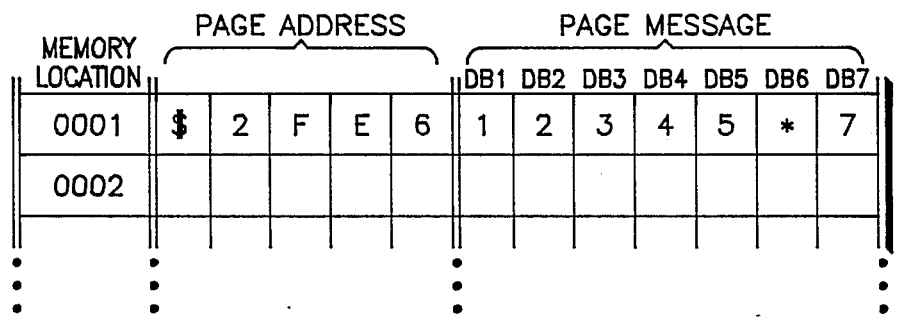

Once a duplicate page is determined to be present in duplication buffer 115, microcomputer 90 commences to implement an error correction routine (detailed later in the flow chart of FIG. 7A–C) as discussed briefly below. Errors in the original or first page message portion are corrected by substituting the contents of non-errored data blocks of the duplicate second page message portion for corresponding errored data blocks of the first page message portion already in memory 110 at location 0001. That is, the errored data block DB4 of the first page message portion is replaced by the unerrored data block DB4 of the second page message portion, resulting in a "4" replacing the "*" in DB4 at memory location 0001. Thus, after microcomputer 90 conducts such error correction, the corrected first page message portion in memory location 0001 reads as **12345\*7 as seen in the memory representation in FIG. 6D**. It is noted that in this particular situation, although a duplicate page was determined to exist, DB6 of the first page message portion could not be corrected since DB6 of the second page message portion also contained an error.

Figure 6E:
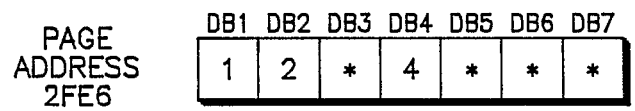
Figure 6F:
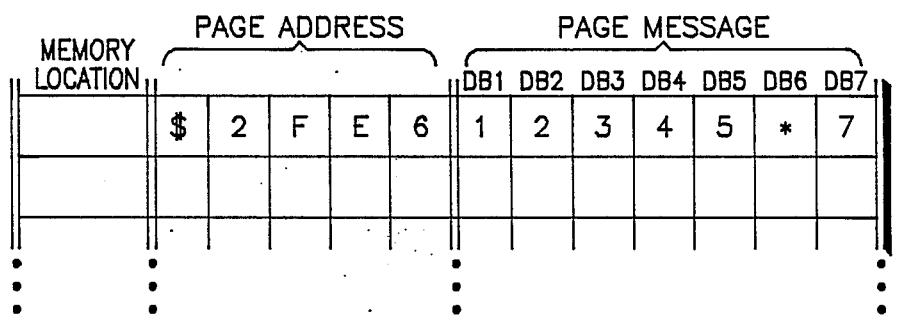

FIGS. 6E–6F illustrate an alternative second duplicate page test for determining if a particular page message portion is a duplicate of a prior page message portion. For purposes of this test it as assumed that the first page shown in FIG. 6A is already in memory and that the second page shown in FIG. 6E is in duplication buffer 115. The second page is addressed to pager address $2FE6 and contains the information **12\*4\*\*\*. That is, microcomputer 90 has determined that there are no errors in data blocks DB1, DB2 and DB4. However, data blocks DB3, DB5, DB6 and DB7 were found to contain errors when tested by microcomputer 90 and thus microcomputer 90** placed "\*" error characters in those data blocks as seen in the duplication buffer representation of FIG. 6E. Since the second page in duplication buffer 115 has a page address, $2FE6, the second page message portion is tested against all other page message portions in memory 110 which have the same page address, $2FE6. It is noted that, rn this example, there is one such page message portion with the same address, namely the first page message portion stored in memory location 0001 as seen in FIG. 6B.

In this second duplicate page test, microcomputer 90 checks to see if the page under test, namely the page message portion in duplication buffer 115, contains at least two consecutive data blocks which are unerrorred. The second page message portion shown in FIG. 6E meets this criteria since data blocks DB1 and DB2 thereof are both unerrorred. After this initial determination is made that the page message portion in the duplication buffer 115 contains two consecutive unerrorred data blocks, then microcomputer 90 compares each data block in duplication buffer 115 with the corresponding data blocks of each page in memory 110 having the same address as the page message portion in duplication buffer 115. For example, the second page message portion in duplication buffer 115 has the same address, $2FE6, as the first page message portion stored at memory location 0001. Thus microcomputer 90 compares each data block of the second page message portion in duplication buffer 115 with the corresponding data block of the first page message portion at memory location 0001 (see FIG. 6B). When this comparison is carried out, micrcomputer 90 finds matches in data blocks DB1 and DB2. Microcomputer 90 also find "don't know" conditions for the remainder of the compared data blocks DB3, DB4, DB5, DB6 and DB7. However, in this test, no non-matching data blocks were found and at least one matching data block was found.

In summary, under the second duplicate page test above, the second page message portion in duplication buffer 115 is found to be a duplicate of the first page message portion at memory location 0001 because it meets the following test criteria: (1) the page address of the second page message portion is the same as the page address of the first page message portion, namely $2FE6, (2) the second page message portion contains at least two consecutive unerrorred data blocks, and (3) at least one data block of the second page message portion matches with the corresponding data block of the first page message portion.

Now that a duplicate page is determined to be present in duplication buffer 115, microcomputer 90 commences to implement the error correction routine described above in the discussion of test 1. That is, errors in the first page message portion are corrected by substituting the contents of non-errored data blocks of the duplicate second page message portion for corresponding errorred data blocks of the first page message portion already in memory 110 at location 0001. Thus, after microcomputer 90 conducts such error correction, the corrected first page message portion in memory location 0001 reads as **12345\*7 as seen in the memory representation in FIG. 6F**. It is noted that in this particular situation, although a duplicate page was determined to exist, DB6 of the first page message portion could not be corrected since DB6 of the second page message portion also contained an error.

Figure 6G:
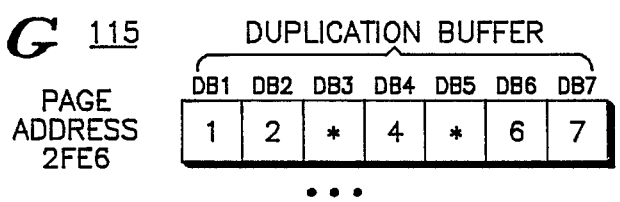
Figure 6H:
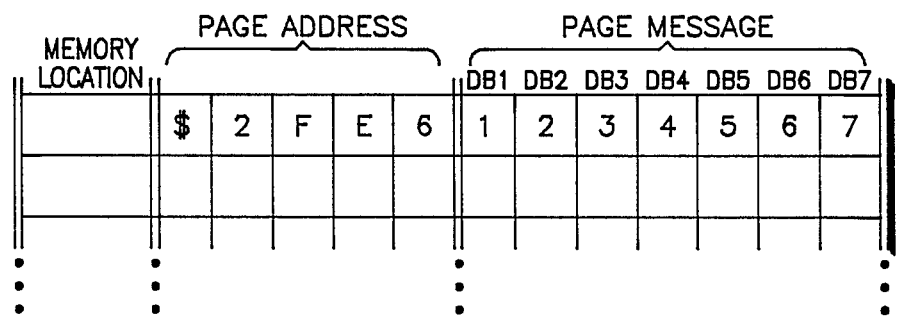

FIGS. 6G–6H illustrate an alternative third duplicate page test for determining if a particular page message portion is a duplicate of a prior page message portion. For purposes of this test it as assumed that the first page shown in FIG. 6A is already stored in memory 110 at location 0001 and that the second page shown in FIG. 6E is in duplication buffer 115. The second page is addressed to pager address $2FE6 and contains the information **12\*4\*67 as seen in FIG. 6G. That is, by checking the parity information of the data blocks, microcomputer 90 has determined that there are no errors in data blocks DB1, DB2, DB4, DB6, and DB7. However, data blocks DB3 and DB5 were found to contain errors when tested by microcomputer 90 and thus microcomputer 90** placed "\*" error characters in those data blocks as seen in the duplication buffer representation of FIG. 6G. Since the second page in duplication buffer 115 has a page address, $2FE6, the second page message portion is tested against all other page message portions in memory 110 which have the same page address, $2FE6. It is noted that, in this example, there is one such page message portion with the same address, namely the first page message portion stored in memory location 0001 as seen in FIG. 6B.

In this third duplicate page test, microcomputer 90 checks to see if the page under test, namely the page message portion in duplication buffer 115, contains at least two consecutive data blocks which are unerrorred and to see if more than half (50%) of the data blocks are unerrorred. The second page message portion shown in FIG. 6G meets this criteria since data consecutive data blocks DB1 and DB2, and DB6 and DB7 thereof are both unerrorred, and secondly, because five of the seven data blocks (more than 50%) are unerrorred. After this initial determination is made that the page message portion in the duplication buffer 115 contains two consecutive unerrorred data blocks and that 50% of the data blocks are unerrorred, then microcomputer 90 compares each data block in duplication buffer 115 with the corresponding data blocks of each page in memory 110 having the same address as the page message portion in duplication buffer 115. For example, the second page message portion in duplication buffer 115 has the same address, $2FE6, as the first page message portion stored at memory location 0001. Thus microcomputer 90 compares each data block of the second page message portion in duplication buffer 115 with the corresponding data block of the first page message portion at memory location 0001 (see FIG. 6B). When this comparison is carried out, microcomputer 90 finds matches in the corresponding data blocks DB1 and in the corresponding data blocks DB2. Further, matches are found in the corresponding data blocks DB4 and the corresponding data blocks DB7. Microcomputer 90 also finds "don't know" conditions for the remainder of the compared data blocks DB3, DB4, and DB5. However, in this test no non-matching data blocks were found, and at least one matching data block was found.

In summary, under the third duplicate page test above, the second page message portion in duplication buffer 115 is found to be a duplicate of the first page message portion at memory location 0001 because it meets the following test criteria: (1) the page address of the second page message portion is the same as the page address of the first page message portion, namely $2FE6, (2) the second page message portion contains at least two consecutive unerrored data blocks, (3) more than 50% of the data blocks of the second pager message portion are unerrored and (4) at least one data block of the second page message portion matches with the corresponding data block of the first page message portion and no mismatches occur between a data block of the second page message portion and the corresponding data block of the first page message portion.

Now that a duplicate page is determined to be present in duplication buffer 115 by meeting the criteria of duplicate page test 3, microcomputer 90 commences to implement the error correction routine described above in the discussion of test 1. That is, errors in the first page message portion are corrected by substituting the contents of nonerrored data blocks of the duplicate second page message portion for corresponding errored data blocks of the first page message portion already in memory 110 at location 0001. Thus, after microcomputer 90 conducts such error correction, the corrected first page message portion in memory location 0001 reads as 1234567 as seen in the memory representation in FIG. 6H. It is noted that in this particular situation, the duplicate page included sufficient unerrored information such that all the errored data blocks of the first page message portion could be corrected.

A somewhat more complex example of the operation of one embodiment of the present invention is now discussed. It is assumed that microcomputer 90 is using duplicate page test 3 described above for purposes of the subsequent discussion. The details of the methodology of test 3 are discussed in detail in the later description of the flowchart in FIG. 7A-7C. In the present example, paging receiver 40 is a multi-address receiver with unique designated digital addresses $2FE6 and $2FE7. This example takes memory 100 in the condition it was in at the end of the preceding example, that is, with memory location 0001 filled with a corrected page message portion 1234567 addressed to pager address $2FE6 as seen in FIGS. 6H and 6L. Receiver 40 now receives and decodes a third page with address $2FE6 and having a page message portion 4756449 as seen in FIG. 6I. Microcomputer 90 places the message portion of this third page in duplication buffer 115. In this particular example, the third page message portion was found to have no errors and thus no "*" error characters were inserted in any of the data blocks of the third page message portion. Microcomputer 90 conducts duplicate page test 3 by checking to see in there are any other pages in memory 110 with the same address as the third page and it is found that there is one other such page for $2FE6, namely the page at memory location 0001. Microcomputer 90 then determines that the third page message portion in duplication buffer 115 includes at least two consecutive data blocks which are unerrored and that more than 50% of the data blocks thereof are unerrored. However, when microcomputer 90 tests the corresponding data blocks DB1 of the first page (namely, a "1") and DB1 of the third page (namely a "4" in buffer 115, it finds that at least one mismatch has occurred. Thus the third page fails the duplicate page test and is not designated a duplicate page by microcomputer 90. Rather, the third page is designated a non-duplicate page and is stored in memory location 0002 as $2FE6 4756449 as seen in FIG. 6L.

The paging terminal now sends a fourth page having address $2FE7 and a page message portion 1472860 as represented in FIG. 6J. The fourth page is received and decoded by paging receiver 40, but in this example, microcomputer 90 located errors in data blocks DB2 and DB5. Thus, the fourth page message portion which microcomputer places in duplication buffer 115 is 1*72*60 as seen in FIG. 6K. Microcomputer 90 conducts duplicate page test 3 by checking to see if there are any other pages in memory 110 with the same address as the fourth page and it is found that there are no other pages in memory for address $2FE7. The duplication test is then discontinued and the fourth page address and message portion are stored at memory location 0003 as $2FE7 1*72*60.

Figure 6M:
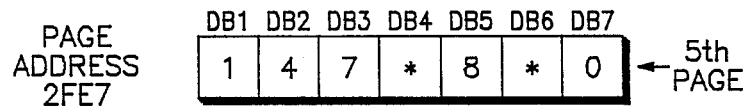

The paging terminal now sends a fifth page having address $2FE7 and a page message portion 1472860 identical to the fourth page as represented in FIG. 6J. The fifth page is received and decoded by paging receiver 40, but in this example, microcomputer 90 located errors in data blocks DB4 and DB6. Thus, the fifth page message portion which microcomputer places in duplication buffer 115 is 147*8*0 as seen in FIG. 6M. Microcomputer 90 conducts duplicate page test 3 by checking to see if there are any other pages in memory 110 with the same address as the fifth page and it is found that there is one other such page, namely the fourth page in memory location 0003. Microcomputer 90 then determines that the fifth page message portion in duplication buffer 115 includes at least two consecutive data blocks which are unerrored and that more than 50% of the data blocks thereof are unerrored. Microcomputer 90 then conducts a data block by data block comparison of the data blocks of the page message portion in memory location 0003 with the corresponding data blocks of the fifth page message portion in duplication buffer 115. Matches are found in the corresponding DB1, DB3 and DB7 data blocks and no mismatches are found between corresponding data blocks. Thus all the criteria for duplicate page test 3 have been met and it is determined that the fifth page is a duplicate of the fourth page in memory location 0003.

Figure 6N:
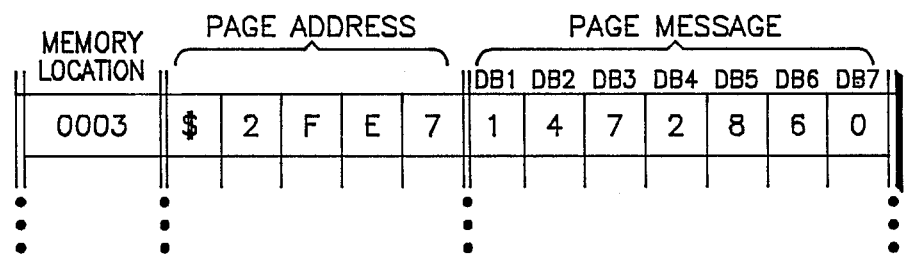

Now that a duplicate page is determined to be present in duplication buffer 115 by meeting the criteria of duplicate page test 3, microcomputer 90 commences the implementation of the error correction routine. That is, errors in the fourth page message portion at memory location 0003 are corrected by substituting the contents of non-errored data blocks of the duplicate fifth page message portion in duplication buffer 115 for corresponding errored data blocks stored at memory location 0003. Thus, after microcomputer 90 conducts such error correction, the corrected fourth page message portion in memory location 0003 reads as $2FE7 1472860 as seen in FIG. 6N. It is noted that in this particular situation, the duplicate page included sufficient unerrorred information such that all the errorred data blocks of the fourth page message portion could be corrected.

Figure 6O:
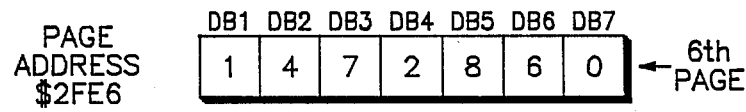

Continuing with this example, the paging terminal now transmits a sixth page which is addressed to $2FE6 and exhibits a page message portion 1472860. In this particular example, receiver 40 decodes the sixth page in detects no errors. Microcomputer 90 places the sixth page message portion in duplication buffer 115 as seen in FIG. 6O. It is noted that although the message portion content of the sixth page is identical to the message portion content of the fifth page stored at memory location 0003, the address of the sixth page is different than the fifth page. That is, the fifth page is addressed to pager address $2FE7 whereas the sixth page is addressed to pager address $2FE6.

Microcomputer 90 commences duplicate page test 3 to determine if the sixth page is a duplicate of any other page already in memory. As part of that test, microcomputer 90 determines that at least two consecutive data blocks of the sixth page message portion are unerrorred and that more than 50% of the data blocks of the sixth page message portion are unerrorred. Testing further, microcomputer 90 tests to see if the address ($2FE6) of the sixth page matches any other pages in memory 110. Microcomputer 90 determines that the address of the sixth page matches the address of the pages in memory location 0001 and memory location 0002. Thus, microcomputer 90 conducts a block by block comparison of the data blocks of the corresponding data blocks of the sixth page message portion and the message portion at location 0001. (See FIGS. 6L and 6O.) Several mismatches are found and thus it is determined that the sixth page in duplication buffer 115 is not a duplicate of the page at memory location 0001. Microcomputer then proceeds to conduct a block by block comparison of the corresponding data blocks of the sixth page message portion and the message portion stored at memory location 0002. (See FIGS. 6L and 6O.) Again, several mismatches are found and thus it is determined that the sixth page in duplication buffer 115 is not a duplicate of the page at memory location 0002.

Figure 6P:
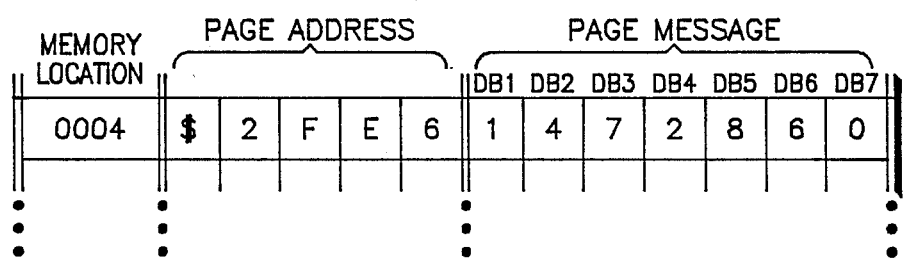

Since the sixth page is determined not to be a duplicate page it is stored at a new memory location 0004 as seen in FIG. 6P. No error correction has been conducted with respect to the sixth page at this point in time. Note that, in this embodiment, although the fifth and sixth pages have identical page message portion contents, since the have different addresses, they are treated as separate or non-duplicate pages. This is generally desirable because each address is usually given by the pager user to a single caller. In this manner, the user knows that if a page message is received for address 1, then the message is from caller number 1, and similarly that if a page message is received for address 2, then such message is from caller number 2.

Those skilled in the art will appreciate the duplicate page test may be modified to regard the fifth and sixth pages as being duplicates under circumstances where this is desirable by removing the criteria from the test which specifies that for a subsequent page to be considered a duplicate of a prior page, both pages must have the same address. This is useful in countries where it is common practice for the caller to send a message first to address 2 of a particular pager, and then, if the pager user has not responded after a period of time has elapsed, then the caller sends the same message to address 4 of the same pager to indicate an increased urgency of some sort. (In the prior example, addresses 2 and 4 are arbitrarily selected addresses given for purposes of example.)

Figure 7A:
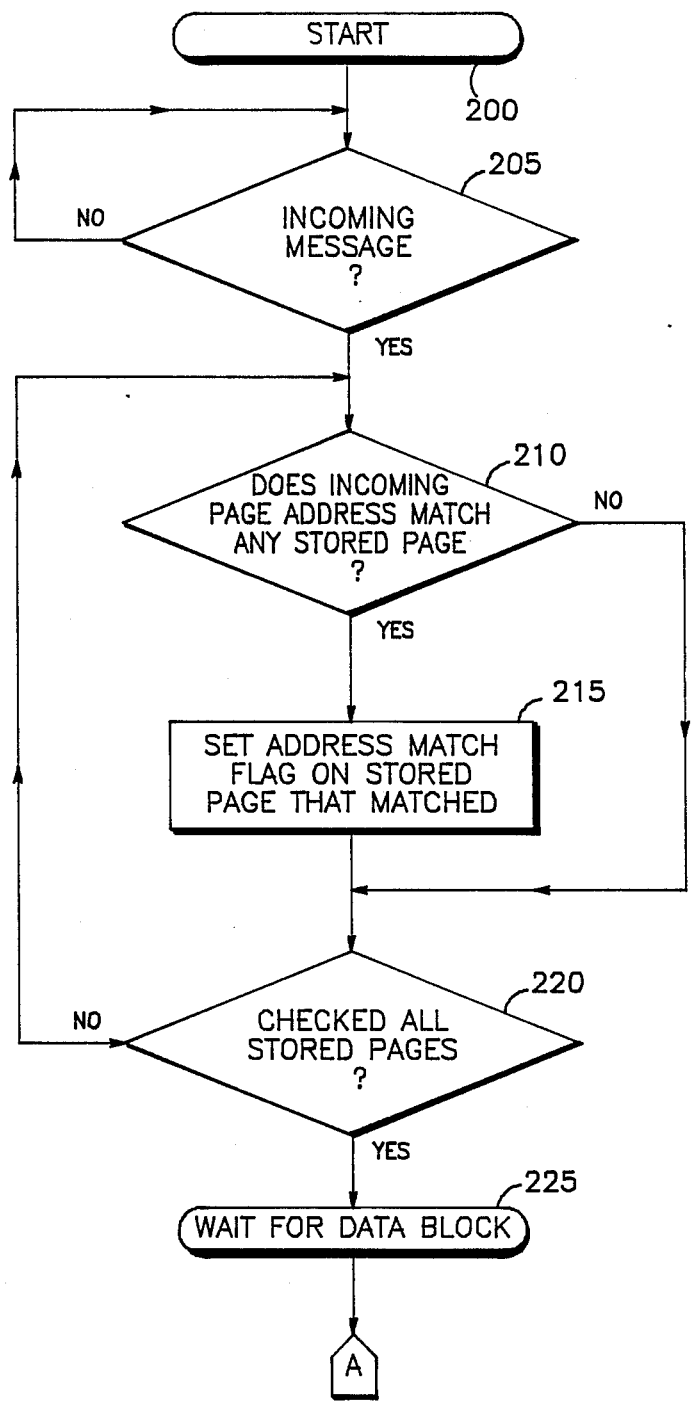
FIG. 7A-7C is a flow chart of the process flow of one embodiment of the paging receiver of the invention.
Figure 7B:
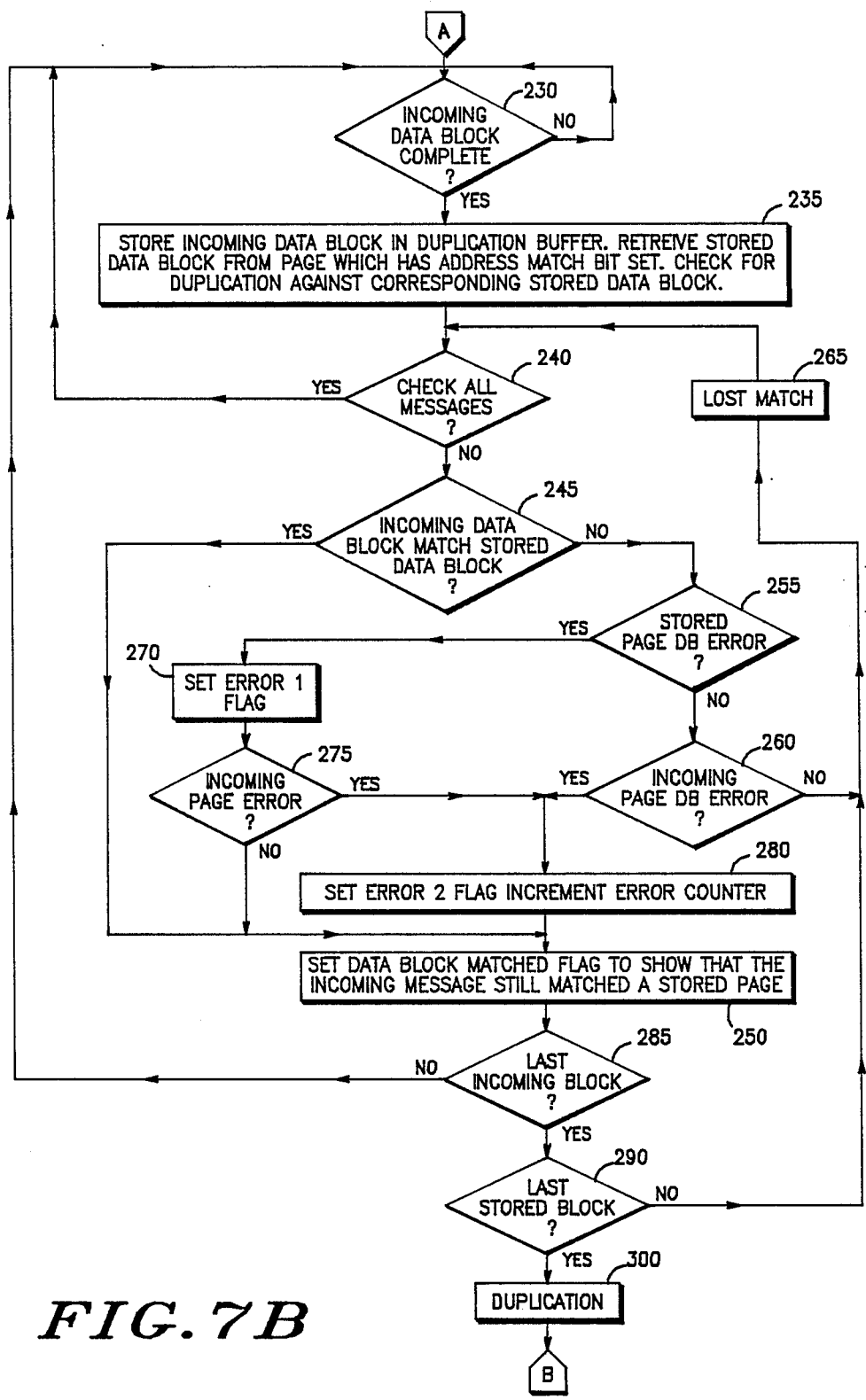
Figure 7C:
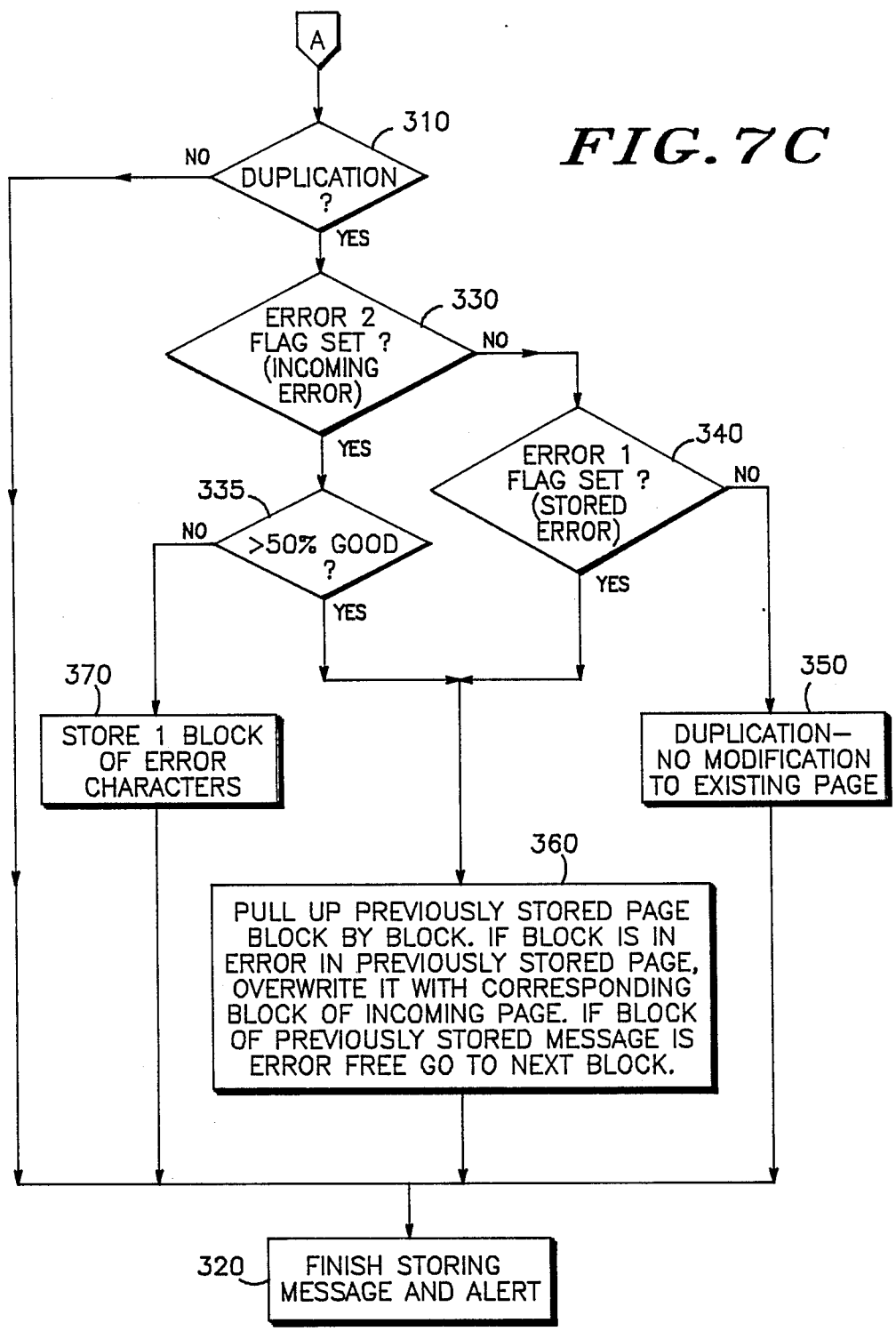

FIGS. 7A, 7B and 7C are a flowchart of one program which is stored in main memory 94 (ROM) to cause microcomputer 90 to perform the duplicate page test 3 described above. The page duplication check routine begins at block 200 upon which microcomputer 90 examines the incoming paging data on input data line 93 to determine whether or not the data is a digital paging message as per decision block 205. (Although not shown in FIG. 5, microcomputer data input line 93 is coupled to the receiver demodulator, which is demodulator 60 in FIG. 4.) If the current data provided to microcomputer 90 is not digital page message data, then microcomputer continues searching the incoming data until such data is found. When digital paging message data is recognized, then process flow continues to another decision block 210 at which a determination is made whether or not the page address associated with the present incoming page message matches the page address of any other page messages stored in random access memory (RAM) 110. In making this determination, the addresses of all pages stored in memory 110 are checked for a match, as per block 220 which forms a loop back to the address match checking block 210 to assure that page addresses are checked. If such a match is found, then an ADDRESS MATCH FLAG is set in memory 110 to flag the stored page or pages which had page addresses which matched as per block 215. If microcomputer 90 determines that there are no page messages in memory 110 which have a page address the same as that associated with the present page message, then no match flags are set. Once it is determined that the present page has been checked for address matching with all stored pages, block 220, then microcomputer 90 waits for data blocks as per block 225. For example, assuming an 8 character data block, when a page is received, there is a period of time between reception and decoding of the page address and completion of reception and decoding of the first data block of a page message. The system waits until all 8 characters of a particular data block are in the system before proceeding.

Process flow then continues from linking block A of FIG. 7A to linking block A of FIG. 7B after which at block 230 a determination is made as to whether or not the incoming data are completed data blocks. This accounts for the significant idle time while the microcomputer 90 waits for data blocks to be completed. In one embodiment, the data blocks contain 8 bits and the system waits until the incoming data block is complete before using the data block in the page duplication test which follows.

When each incoming data block of a page message is complete, then microcomputer 90 stores the data block in duplication buffer 115 and also retrieves stored data blocks from each page in memory 110 which was flagged with an ADDRESS MATCH FLAG as per block 235. Each data block of the current page message in duplication buffer 115 is checked for a match of its data with the data of corresponding data blocks of stored page messages having the same page address, that is those page messages in memory 110 for which ADDRESS MATCH FLAGS are set. The data blocks of the current page message in duplication buffer 110 are checked for matching with corresponding data blocks of all the page messages in memory 110 which were flagged as having the same page address as assured by block 240.

More specifically, if in block 240 it is determined that all page messages in memory have not been so checked, then flow continues to block 245 at which the incoming data block is checked to determine if it matches any of the corresponding data blocks for which address match bits were set and which were retrieved in block 235. If such match is found then microcomputer 90 sets a DATA BLOCK MATCH FLAG (block 250) to show that the incoming message still matches a stored page, at least as far as the particular data block for which we are testing. The matched condition may of course be lost if subsequent data blocks of the incoming page message do not match a particular stored page message under test.

For purposes of this duplication test, the DATA BLOCK MATCH FLAG will still be set even if either of or both of the incoming data block and the corresponding stored page data block contain an error. Since these three situations result in a "don't know" situation where it can,t be absolutely determined whether or not the match has been lost, the DATA BLOCK MATCH FLAG will be set in block 250 to permit the test for duplication to continue.

In more detail, as seen in FIG. 7B, this is accomplished whenever block 245 determines that the incoming data block does not absolutely match with the corresponding retrieved data block from the stored page under test, by conducting a test in block 255 to determine if the retrieved stored page data block contains an error. If such stored page data block contains no error, then the incoming data block is tested for error in block 260. If neither the incoming data block nor the stored page data block contains an error, then match is lost as signified by block 265 and flow continues back to block 240 which tests to make sure that the incoming data block has been tested against all appropriate corresponding data blocks of stored messages.

If however, the stored page data block is found to be in error, then the ERROR1 FLAG is set to indicate such error as per block 270. If the incoming data block is also found to be in error, as determined in decision block 275, then the ERROR2 FLAG is set to indicate such error and an error counter is incremented to keep track of the number of errors as per block 280. Flow then continues to block 250 such that a DATA BLOCK MATCH FLAG is set to indicate that the incoming data block and the corresponding stored page data block matched even though such stored page data block contained an error and the incoming data block contained an error. Also, if in decision block 275 it is determined that the incoming data block contains an error, then flow continues to block 250 where the DATA BLOCK MATCH FLAG is set. This indicates that the incoming data block and the corresponding stored page data block matched even though such stored page data block contained an error and the incoming data block contained no error.

Subsequent to setting the DATA BLOCK MATCH FLAG, a determination is made in block 285 to find out whether or not the current incoming data block was the last data block of that page message. If it was not the last data block then flow continues back to block 230 where microcomputer 90 waits for another incoming block. If the current incoming data block was the last data block of a page message then a determination is made in decision block 290 whether the current data block has been tested against the last stored block which has the same page address. If the present stored data block is not the last data block, then this indicates that although all the data blocks of the incoming page message have to this point matched all the corresponding data blocks of a particular stored page message, the stored page message actually contains more data blocks that the incoming page message and therefore the stored page message does not match the incoming page message.

If the present stored data block is found to be the last data block of a particular page message under test, then flow continues to block 300 which signifies that the incoming page message is potentially a duplicate of a page message already stored in memory. That is, the existence of duplicate pages has not been ruled out under the criteria of duplicate page test 3. Flow continues via linking block B on FIG. 7B to linking block B on FIG. 7C to determination block 310 which tests to see if the page message portion now in the duplication buffer 115 meets CRITERIA 1) and 4) of duplicate page test 3. That is determination block 310 tests to see if both, CRITERIA 1), the page address of the incoming page message portion is the same as the page address of the particular stored page message portion, and CRITERIA 4) at least one data block of the second page message portion matches with the corresponding data block of first page message portion and there are no non-matching corresponding data blocks, are met.

If duplicate page block 310 determines that the incoming page message portion is not a duplicate page under CRITERIA 1 AND CRITERIA 4, then the incoming page message portion is stored in memory (RAM) 110 and the pager is alerted as per block 320. However, if the incoming page message portion has met CRITERIA 1 AND CRITERIA 4, then a determination is made whether or not the ERROR2 flag is set as per decision block 330, the presence of such flag indicating the presence of an error in the incoming page message. If the ERROR2 flag is found not to be set, then a determination is made whether or not the ERROR1 flag is set as per decision block 340. If in block 340 the ERROR1 flag is not found to be set, then both the incoming page message in the duplication buffer 115 and the stored page message which is being tested contained no errors. Thus, such incoming page message passes the test of CRITERIA 2 AND 3, namely that CRITERIA 2) the incoming page message portion contains at least two consecutive unerrorred data blocks, and CRITERIA 3) more than 50% of the data blocks of the incoming page message portion are unerrorred. Both of these criteria are met when the incoming page message contains no errors as here. Under these conditions, the incoming page is designated to be a duplicate page in block 350. Since the tested stored page message contains no errors (no ERROR1 flag set), microcomputer 90 conducts no modification or error correction on such stored page message.

If however, in decision block 340 it is determined that there was an error in the stored page message under test (that is, ERROR1 FLAG was set), then flow continues to error correction block 360 at which each data block of the errored stored page is called up from memory 110 block by block. If a particular block of the stored page message is found to contain an error, then such data block in memory is overwritten with the corresponding data block of the incoming page which has been determined to be a duplicate thereof. If a particular data block of the stored page message contains no error, then the next data block of the stored page message is tested until all the data blocks of the stored page are tested for error and are replaced by corresponding good data blocks from the incoming page message portion when errored data blocks in the stored page message portion are found. In summary, wherever errored data blocks are found in the stored page message, corresponding data blocks from the duplicate page in the duplication buffer 115 are substituted therefor. After the block 360 error correction activity, flow continues to block 320 to complete the storing of the corrected message and to alert the user of the duplicate page message. In this manner, microcomputer 90 provides duplicate page detection and error correction when a duplicate page is detected.

Microcomputer 90 also performs error correction on errored data blocks of the particular stored page message when the message portion in the duplication buffer 115 contains an error or errors. That is, when the ERROR2 FLAG is set as seen in determination block 330 of FIG. 7C (thus indicating error in the incoming message portion in the duplication buffer 115), then a further test is conducted in determination block 335 to determine if more than 50% of the data blocks of the incoming message portion are unerrored. If more than 50% of the data blocks of the incoming message portion are found to be unerrored, the error correction routine of block 360 commences. That is, all of the previously data blocks of the particular page message stored in memory 110 are retrieved. If a particular data block of the stored page message is found to be in error, then the contents of such data block are overwritten in memory 110 by the contents of the corresponding data block from the incoming page providing the corresponding data block of the incoming page message portion itself contains no errors. If a data block of the stored page message is found to be error free, then this error correction routine continues to the next data block of the stored page message until all of the data blocks of the stored page message have been tested for error and corrected with the contents of the corresponding data block from the duplicate incoming page message portion. After such error correction, the storage of the corrected message portion in memory 110 is completed and the pager is alerted as per block 320.

However, if the incoming message portion contains errors and the number of such errors is so high that not more than 50% of the data blocks of the incoming page message portion are unerrored (as determined in decision block 335) then under this particular test (test 3) the error content of the potential duplicate incoming page message portion is deemed to be so high that error correction of the original stored page message will not be conducted. In this instance, one block of error characters (for example, "*'s") are stored in the errored, data block of the stored page message portion as per block 370. The pager receiver then alerts as per block 320.

Table 1 is a listing of one example of the object code which is stored in on-chip ROM 94 to cause microcomputer 90 to perform the duplicate page test 3 and error correction employing the duplicate page information.

```
S11309A0711920012169004171193045298047052E
S11309835E4907501A175013C8B65E44444444268F
S11309C006A60857D720344CAE02428707202C096C
S1130900502919503AD7262312C8B68FA12326098F
S21309E9C01A57A619675F15D2B68FA119260C0C3C
S11309FD5C099F94A6555795C00DCC07883CC0F21
S1130C08730952700C3A9526123D94260E12802058
S1130A100A30942706A6FF87953A9430C827043A8E
S1130A20B201830972702A6FF87D83A97200C5F19
S1130A30E6A8A4F7E7A85CA31026F5CAC8073D88F9
S1130A4026090388803CC0D5BCC0053948A1102543
S1130A501A270DA1802703000060610D81FE6200435
S1130A6011D8198E3DC927DDCC0B3A87C93FB81131D
S1130A70D8CC1D01005C521E8C1F8E04D5021E8E93
S1130A6003D576865EA4C32706E7093FC12005CDAA
S1130A90170C20185FE69844444444481C92720E65D
S1130AACA3A4CFE7A85CA31026E8G4C9021CC73F72
S1130A80953F9412881402C01A141038CC00561474
S1130ACDC8F6A8A4A20E7A820DC86C9A10422A80281
S1130ADDD5043FC9202097A8484488FC25ABFCOEO
S1130AE0E799A680E7A8D61E08B7C5876F97C1D68C
S1130AF01E20BD3B20B9CC0D5610C85FE6A8B7C66F
S1130B0D008C6105CA31026F4CD170C86C24AB788E6
S1130B910C0CC3E69544444444481C926E6BF88CC09
S1130B200CAA202296C187C3BEC0D11E0427334CC1
S1130B3087C105C720BD44CC0D5615C703500214CB
S1130B940C7135000860D12883F943F9514D2CD1AD4
S1130B5D14108801C803CC0D30E8C03005CC5CC49
S1130B600036716D2CC0D3704C8060CC703CC0D177F
S1130B87015C85F4604E16C01D802E174272AA61AFD
S1130B980E16C01D802E174260E8693A001B793B6C6
S1130B9092A2008792200C8693A801B793B692A978
S1130B3A00087925CA30826CB86C187C3BED9D11E89
S1130B800C260F3FC115C716D28D445F0DC712CC1A
S1130BC0180005C7EE4CR7C1ED445F0DC703CC0D78
S1130B0956A3102603CC0C65E6A8A7C60AC6035C65
S1130BE020E8F8B581FC7D61E20BD3E878F0CBE049F
S1130BF087C32007D61E10BD3E87C336C3BD328DB2
S1130C0020BD260C0813B18F26021EC73E8887C5D4
S1130C10D61E10BD381CD820E45F1DD8BD26443628
S1130C2DCFE16C01D802E174260A7A104261E8CC0C8C
S1130C308A11A260410C72000E66C01D802E674B6
S1130C40A11A263C12C7A306272EA307260804C709
S1130C50080EC736202A5C20C30EC72414C88E88D6
S1130C605CA31026101C9E04C8081CC704C703CC10
S1130C701800CC0D56CC0BD11E01B6CF445C20A179
S1130C808E88E6A8A4DFE7A820D41E0102C706018E
S1130C90C718CC187A3D92280626F4309326F0BE52
S1130CA088E6A8A4DFE7A8CC1B0015C88E98E6A871
S1130CB04407A10727014C87C6E6A8A4D6BAC6E778
S1130CC0A88FC000C706865EA4F026081FD800C891
S1130CD003CC0D3DCC0B22B7C6202486C6444444F5
S1130CE0448C7C6AEE4428708BFC586C6B8C5B7970B
S1130CF08E88E6A8AA08E7A81F0900C807203E8E20
S1130D008E6A887C507C5D3300B26043097227C8A0
S1130D101E0800C88F20260AD60A05C713BD44CD73
S1130D20155CC203218D816D215C7B6C187C320072D
S1130D30B6C18B780C016E6B68F87C18D443FC7104A
S1130D40B8E19883F933F923FC93F00118811C816FE
S1130D50B019C8CC0D59CC00E10609D0CB6BFA11907
S11318001D6CD17CC86C3E7D986C157DD18863D07
S1131319228826043D4327553FC3803280208DA8
S1131820265D7A2725CD1BF1B6D3B7C1B6D9B7C3C1
S11318300098804198B2003CD155C85C1B70DB6C386
S1131540B7D9BD448B0A8B7C32001C01BF1B6DD87E2
S1131E50C3098B0D198886D987C38609B78DC0168C
S1131E60E6B68FB7C1BD44B6C05768BCC0CC35FA675
S1131570E76C5CA30826F9200311D81FC7BE8BC3
S11318D561E20BD3E878F87DDB7C33FD4BE6C3B7A5
S1131E90BE90328D20E8C26B7DDCD1BF1B6CAB7C38C
S11315A0BD3ZB02C9C26B7DA26021EC75FBD2644E5E
S1131B6036CFB7C5F46CA11A260A4307272C86C5E8
S1131ECD0876C14E45CA3D727E8325E204880C1E014C
S1131B03B5D87C30FC786CC0CAA36B8B7C3B6D095
S11318E0B7C1PD32EDA208B4420E436CF44E76C296C
S11318FCD15F80264436CFF76CA30627035C20F2F1
S1131C001E015C86CF44E76C8113B01A88A60887E1
S1131C109A8ECDE69844444444A10525044E052075
S1131C200E87C5F6A8A4102604AE012002BEC55A09
S1131C30D61DFBB79987988186012613A602B701A2
S1131C4018011F88CD17C80DC80DCD170320083F21
S1131C50D11901B6D127000A8903CD18223F94A6C5
S1131C605557958118B80CC8060A8803CD17C70E80
S1131C70BEE808B8E8CD17C3CD17CFCD17C70DC862
S1131C80DCCD17D3200712D83FDDB0DDE6932602C
S1131C902075160F1408BE00E6A8A4102703CC1DA1
S1131CA004462DAD283FDF18C73F761A769EDDCDDE
S1131CB01117BE8F8FD98EC3BFDA9E8CA303271SC7
S1131CCDA1042730A00A86DAB7C3B6D9B7AF20DF72
S1131CDD0F10FD971181A10F27094104272ADF02F
S1131CE00C761E1ED13676B7DF19C7B1B6DFB7764C
S1131CF018C73F8C8860A87C38609B78FCD11282031
```

```
S1131D00B1070F18A604ADC81E010308113CDDBEEF
S1131D10DDA3102707E69B27F4CC1C9213D815D813
S1131D200F10F0170F19C781CC1C925F3FC5E69BAE
S1131D3026075CA310270D20F5E6AB87C608C6F24C
S1131D403CC520EE86C5088806A101220420001A6B
S1131D500B811E011F01B7CDA607B7C4A6E0B70C22
S1131D60B023B6C5B0261E01911E01B7CDA607E78A
S1131D70C48032B023B0261E01815F3FC6E6AB480C
S1131D8025075CA310271120F43CC6B6C6A108267B
S1131D90F116D820031608818EC0E6ABA4102703E1
S1131DA0CC1DF4B6CCA17C24ECB7C6D61E20BD3E17
S1131DC0878FB7C3B032B020B026B7C3B18F2706C9
S1131D0C01E013CCC20EE1E0186CCA17C2402200EC8
S1131DD0BEC0E6AB9849250EB6C6B7CC20B7BEC088
S1131DE0E6AB9849240E17D8B6CC80C6B7C5B6C66C
S1131DF0B0C5B7CC06D89ECD17AD81FEBEA8AAA0AB
S1131E00393633302F5F8FBF00306090000E1E3097
S1131E10D001D2D3D4D506D7D8D9DADBDC0DDEDF46
S1131E20C0C1C2C3C4C5C6C7C8C9CACBCCCDCECF36
S1131E30280801060C805E0506075E204D45535385
S1131E404147455E20204E4F204D45535341474561
S1131E50532020205E20204D454D4F525920465599
S1131E604C4C2020205E20202020204454C45540A
S1131E70453F202020205E204D4158494D554D0209E
S1131E804C4F43484544205E20202020202020052039

S1131E907E2006202020205E2005200520052000
S1131EA005200520052005200520055E4F4646B3F5ED3E4
S1131EB0A5203F5E1F1C131010101F001F000018E5
S1131EC004001F001F07190101011F005E11111F9
S1131ED01111111F00111F1F1F1F1F005E1F1B49
S1131EE011001B1B1F C00000400E1F0F0E0E00000429
S1131EF00E1F000000005E0E0A0A1F181B1F000FAE
S1131F00091F1313121E005E1F19191513131F0046
S1131F105E1F150E04040404005E04000E11111F5C
S1131F20110D0E090E090E0310000A000E11111FD
S1131F300E000E100E110E010E00060908108F2
S1131F401F005E000F10100CF02000002040E111F80
S1131F50100E0008040E111F100E001F000E111F9A
S1131F60100E000400040810110E005E434F505977
S1131F70524947485420404F544F F4544F4C41203101
S1131F80393835FFFFFFFFFFFFFFFFFFFFFFFFB4
S1131F90FFFFFFFFFFFFFFFFFFFFFFFFFFFFFF4D
S1131FA0FFFFFFFFFFFFFFFFFFFFFFFFFFFFFF3D
S1131FB0FFFFFFFFFFFFFFFFFFFFFFFFFFFFFF2D
S1131FC0FFFFFFFFFFFFFFFFFFFFFFFFFFFFFF1D
S1131FD0FFFFFFFFFFFFFFFFFFFFFFFFFFFFFF0D
S1131FE0FFFFFFFFFFFFFFFFFFFFFFFFFFFFFFFD
S1131FF0FFFFFFFF010001000149024701000110004A
S9030000FC
```

In one embodiment of the invention, microcomputer 90 truncates a message when two consecutive errored data blocks are received. Thus the page message becomes truncated in that the portion of the page message which is prior to the two consecutive errored data blocks is stored in memory along with the two consecutive errored data blocks. This is how a truncated message is flagged so that it can later be determined that such message was truncated. Stated alternately, the reception of two consecutive errored data blocks results in the subsequent portion of the page message being truncated. That is, the portion of the page message subsequent to the two consecutive errored data block is not stored in memory 110, but rather becomes truncated.

Figure 8A:
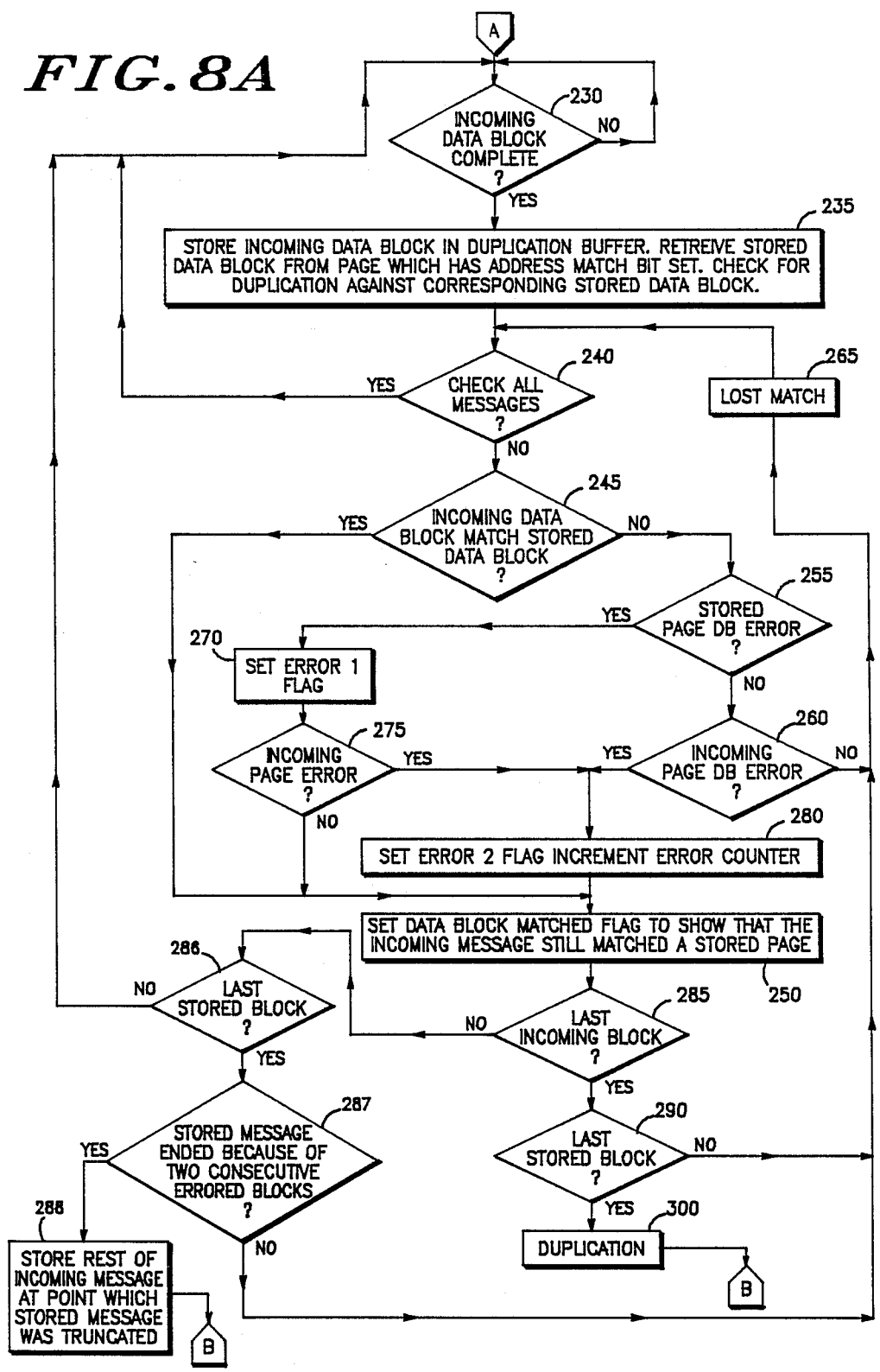
FIG. 8A is a flow chart of the process flow of another embodiment of the paging receiver.

An alternative embodiment of the invention addresses the problem of page duplication and error correction when a message becomes truncated in the manner above. That is, FIG. 8A shows a modification to the flowchart of FIG. 7B which addresses this concern. Microcomputer 90 performs its tasks in substantially the same manner as detailed in the flowchart of FIGS. 7A, 7B and 7C except for the modification shown in FIG. 8A. The flowchart of FIG. 8A is identical to the flowchart FIG. 7B except as follows: In the flowchart of FIG. 8A as in the FIG. 7B flowchart, at block 250 the DATA BLOCK MATCHED FLAG is set to indicate that all data blocks of the incoming page message have thus far matched the corresponding data blocks of the stored page under test. That is, thus far there have been no mismatches between corresponding data blocks. Decision block 285 of the flowchart of FIG. 8A checks to see if the current incoming data block is the last data block of the incoming message as is done in the flowchart of FIG. 7B. However, in the flowchart of FIG. 8A, if decision block 285 determines that the current data block is the last data block of an incoming data message, then another determination is made at decision block 286 as to whether or not the stored data block just tested by microcomputer 90 for matching with the last data block of the incoming message is the last data block of such stored message. If such data block is not the last data block of the stored message then the process flow of microcomputer 90 returns to decision block 230 at which microcomputer 90 waits for more incoming data blocks.

However, if a determination is made at decision block 286 that microcomputer 90 has not yet cycled though the last data block of the stored message under test, then microcomputer 90 tests to see if such stored message ended or was truncated because there were two consecutive errored data blocks as per decision block 287. If the stored message was truncated for this reason, then the remainder of the incoming message is stored in memory beginning at the point in memory where the stored message was truncated as per block 288. Thus the complete message is now stored in memory 110. The process flow of microcomputer 90 then continues to block B and subsequent flow continues as in the flowchart of FIGS. 7A, 7B and 7C. However, if a determination is made in decision block 287 that the stored message under test did not end because it contained two consecutive data blocks, then microcomputer 90 recognizes that match has been lost and process flow is sent to lost match block 265 after which process flow continues as in the flowchart of FIGS. 7A, 7B and 7C.

From the above description, it is clear that the invention involves a method of processing digital data pages including the steps of receiving a first paging signal to provide a first received paging signal and decoding the received first paging signal to provide a decoded first paging signal; After decoding the received paging signal, the method proceeds to storing the data page message of the decoded first paging signal in a memory. The method further includes the steps of receiving a subsequent paging signal to provide a received subsequent paging signal and decoding the received subsequent paging signal to provide a decoded subsequent paging signal. The method of processing includes determining if the data message portion of the decoded subsequent paging signal is a duplicate of the data message portion of the decoded first paging signal, and determining if the alphanumeric message portion of the decoded first paging signal contains an error. The paging receiver replaces the alphanumeric message portion of the decoded first paging signal in the memory with the alphanumeric message portion of the decoded subsequent paging signal if the alphanumeric message portion of the decoded first paging signal contains an error.

In summary, the foregoing describes an apparatus and method for processing received page message signals which provides error correction to a stored page message when a duplicate of that message is later received by the paging receiver. The pager includes apparatus for performing a high reliability test to assure that the current incoming page actually is a duplicate of a page already stored in memory.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A radio paging receiver that receives, decodes and displays pages transmitted over a radio link, said receiver comprising:
   receiving means for receiving coded pages which include an address portion and a corresponding data message portion to produce received pages;
   decoding means; coupled to said receiving means, for decoding the received pages;
   memory means, coupled to said decoding means, for storing the message portion of a page as decoded by said decoding means,
   replacement means, coupled to said memory means, for replacing errorred data blocks of a prior message portion with unerrorred data blocks of a subsequent portion when said subsequent message portion is a duplicate of said prior message portion.

2. A radio paging receiver that receives, decodes and displays pages transmitted over a radio link, said receiver comprising:
   receiving means for receiving coded pages which include an address portion and a corresponding data message portion to produce received pages;
   decoding means, coupled to said receiving means, for decoding the received pages;
   memory means, coupled to said decoding means, for storing the message portion of a page as decoded by said decoding means,
   page duplication checking means for determining if a subsequent message portion is a duplicate of a prior message portion stored in said memory means,
   replacement means, coupled to said page duplication checking means, for replacing errorred data blocks of said prior message portion with unerrorred data blocks of said subsequent message portion when the page duplication checking means determines that said subsequent message portion is a duplicate of said prior message portion.

3. A radio paging receiver that receives, decodes and displays pages transmitted over a radio link, said receiver comprising:
   receiving means for receiving coded pages which include an address portion and a corresponding data message portion to produce received pages, said data message portion including a plurality of data blocks;
   decoding means, coupled to said receiving means, for decoding the received pages;
   memory means, coupled to said decoding means, for providing a memory for storing the message portion of a page as a plurality of data blocks,
   error checking means, coupled to said decoding means, for determining if any data blocks in the message portion of the decoded pages contained an error;
   duplicate page checking means, coupled to said decoding means and said memory means, for comparing data blocks of a subsequent message portion with the corresponding data blocks of a prior message portion stored in said memory means except for errorred data blocks in prior and subsequent message portions, said subsequent message portion being designated a duplicate message portion if at least one of the data blocks of said subsequent message portion is identical to the corresponding data block of said prior message portion;
   replacement means, coupled to said memory means, for replacing errorred data blocks of said prior message portion stored in said memory means with corresponding non-errorred data block of said subsequent message portion when said duplicate page checking means determines that said subsequent message portion is a duplicate of said prior message portion, and
   display means, coupled to said memory means, for displaying stored messages to a pager user.

4. The receiver of claim 3 wherein the duplicate page checking means designates said subsequent message portion as a duplicate of said prior message portion if at least two consecutive data blocks of said subsequent message portion are unerrorred and at least one of the data blocks of said subsequent message portion is identical to the corresponding data block of said prior message portion.

5. The receiver of claim 3 wherein the duplicate page checking means designates said subsequent message portion as a duplicate of said prior message portion if more than half of the data blocks of said subsequent message portion are unerrorred and at least one of the data blocks of said subsequent message portion is identical to the corresponding data block of said prior message portion.

6. In a radio paging receiver for receiving and decoding coded paging signals, said paging signals including page address and data page message portions, a method for processing said paging signals comprising the steps of:
   receiving a first paging signal to provide a first received paging signal;
   decoding said received first paging signal to provide a decoded first paging signal;
   storing the data page message portion of said decoded first paging signal in a memory;
   receiving a subsequent paging signal to provide a received subsequent paging signal;
   decoding said received subsequent paging signal to provide a decoded subsequent paging signal;
   determining if the data page message portion of said decoded subsequent paging signal is a duplicate of the data page message portion of said decoded first paging signal;
   determining if the data page message portion of said decoded first paging signal contains an error, and
   replacing the data page message portion of said decoded first paging signal in said memory with the data page message portion of said decoded subsequent paging signal if the data page message portion of said decoded first paging signal contains an error.

7. In a radio paging receiver for receiving and decoding coded paging signals, said paging signals including page address and alphanumeric page message portions, said page message portions containing a plurality of data blocks, a method for processing said paging signals comprising the steps of:

receiving a first paging signal to provide a first received paging signal;

decoding said received first paging signal to provide a decoded first paging signal;

storing the data page message portion of said decoded first paging signal in a memory;

receiving a subsequent paging signal to provide a received subsequent paging signal;

decoding said received subsequent paging signal to provide a decoded subsequent paging signal;

determining if the data page message portion of said decoded subsequent paging signal is a duplicate of the data page message portion of said decoded first paging signal;

determining if the data page message portion of said decoded first paging signal includes any errored data blocks, and replacing any errored data blocks in said data page message portion of said decoded first paging signal in said memory with corresponding data blocks of the data page message portion of said decoded subsequent paging signal.

8. In a radio paging receiver for receiving and decoding coded paging signals, said paging signals including page address and data page message portions, said page message portions including a plurality of data blocks, a method for processing said paging signals comprising the steps of:

receiving and decoding a first paging signal to provide a decoded first page address portion and a decoded first page message portion;

truncating said decoded first page message portion at a point in said message portion where two consecutive errored data blocks are located to provide a truncated first page message portion which is N data blocks long;

storing said truncated first page message in a memory;

receiving and decoding a second paging signal to provide a decoded second page address portion and a decoded second page message portion;

determining if the first N data blocks of said second page message portion are a duplicate of the N data blocks of said first page message portion, appending in said memory the remainder of the data blocks of said second page message portion subsequent to said first N data blocks thereof to said truncated first page message portion to form a completed first page message portion.

* * * * *